US009940329B2

(12) United States Patent
Schnase et al.

(10) Patent No.: US 9,940,329 B2
(45) Date of Patent: Apr. 10, 2018

(54) SYSTEM AND METHOD FOR PROVIDING A CLIMATE DATA PERSISTENCE SERVICE

(71) Applicant: The United States of America represented by the Administrator of the National Aeronautics and Space Administration, Washington, DC (US)

(72) Inventors: John L. Schnase, Laurel, MD (US); Daniel Q. Duffy, Gambrills, MD (US); Glenn S. Tamkin, Silver Spring, MD (US); Mark McInerney, Chevy Chase, MD (US); Denis Nadeau, Baltimore, MD (US); John H. Thompson, Fairfax Station, VA (US); Scott Sinno, Atlanta, GA (US); Savannah L. Strong, Stevensville, MD (US); William David Ripley, III, Highland, MD (US)

(73) Assignee: The United States of America, as represented by the Administrator of the National Aeronautics and Space Administration, Washington, DC (US)

( * ) Notice: Subject to any disclaimer, the term of this patent is extended or adjusted under 35 U.S.C. 154(b) by 335 days.

(21) Appl. No.: 14/706,570

(22) Filed: May 7, 2015

(65) Prior Publication Data
US 2016/0328410 A1 Nov. 10, 2016

(51) Int. Cl.
*G06F 7/00* (2006.01)
*G06F 17/00* (2006.01)
(Continued)

(52) U.S. Cl.
CPC .... *G06F 17/30073* (2013.01); *G06F 17/3007* (2013.01); *G06F 17/30076* (2013.01); *G06Q 50/26* (2013.01)

(58) Field of Classification Search
CPC ......... G06F 17/30073; G06F 17/30076; G06F 17/3007; G01W 1/00; G06Q 50/26
(Continued)

(56) References Cited

U.S. PATENT DOCUMENTS 5,848,378 A * 12/1998 Shelton ................... G01W 1/10
702/3
6,792,615 B1 * 9/2004 Rowe ................... G11B 27/031
348/E5.108

(Continued)

*Primary Examiner* — Md I Uddin
(74) *Attorney, Agent, or Firm* — Christopher O. Edwards; Bryan A. Geurts; Mark P. Dvorscak (57) ABSTRACT

A system, method and computer-readable storage devices for providing a climate data persistence service. A system configured to provide the service can include a climate data server that performs data and metadata storage and management functions for climate data objects, a compute-storage platform that provides the resources needed to support a climate data server, provisioning software that allows climate data server instances to be deployed as virtual climate data servers in a cloud computing environment, and a service interface, wherein persistence service capabilities are invoked by software applications running on a client device. The climate data objects can be in various formats, such as International Organization for Standards (ISO) Open Archival Information System (OAIS) Reference Model Submission Information Packages, Archive Information Packages, and Dissemination Information Packages. The climate data server can enable scalable, federated storage, management, discovery, and access, and can be tailored for particular use cases.

16 Claims, 7 Drawing Sheets

(51) Int. Cl.
*G06F 17/30* (2006.01)
*G06Q 50/26* (2012.01)

(58) Field of Classification Search
USPC .................. 707/661, 662, 668; 715/772, 835
See application file for complete search history.

(56) References Cited

U.S. PATENT DOCUMENTS

| 7,856,228 B2* | 12/2010 | Lekutai .................. G01W 1/02 340/601 |
| 2013/0014046 A1* | 1/2013 | Watts ...................... G01W 1/00 715/772 |
| 2015/0046532 A1* | 2/2015 | Szczytowski ....... G06F 11/3086 709/204 |

* cited by examiner

SYSTEM AND METHOD FOR PROVIDING A CLIMATE DATA PERSISTENCE SERVICE

BACKGROUND

1. Technical Field

The present disclosure relates to climate data services and more specifically to a particular combination of technologies that can deliver climate data persistence as a service for large climate datasets.

2. Introduction

Climate models generate data that are of great value to society. Climate model outputs include retrospective analyses that model the historical state of the climate, estimates of current climate conditions, and projections of future climate conditions. Climate data analytics as a service provides an approach that makes it easier to access the data and perform data analyses where the data are stored before moving reduced, more usable products to the end user for further study. The current technologies are deficient, however, because no effective means exists for storing and managing data products that are dynamically created by climate data analytic systems. What is needed is an improved approach that makes it easier to store and manage specialized collections of climate data and the dynamically created products produced by climate data analytics.

DETAILED DESCRIPTION

A system, method and computer-readable storage devices are disclosed which deliver climate data persistence as a service. The persistence service (PS) described here is an example embodiment of a key component of an example climate data analytics system. Various modifications and changes may be made to this embodiment without departing from the broader spirit and scope of the disclosure. In particular, alternative data storage technologies may be used as the basis for such a service.

Figure 1:
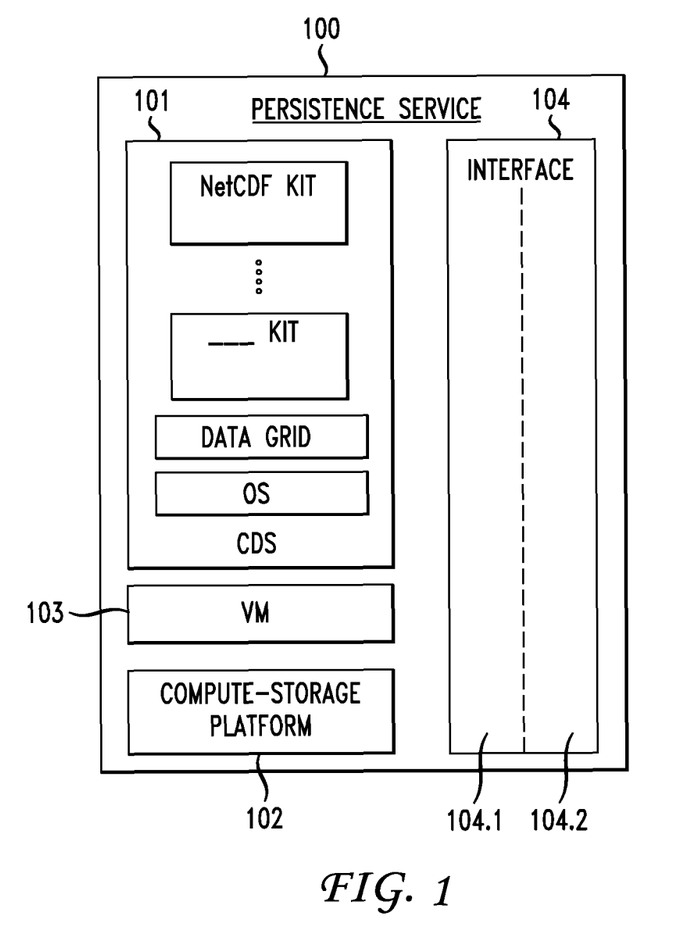
FIG. 1 illustrates an example persistence service.

FIG. 1 is a diagram showing the overall organization of the example persistence service. The service 100 includes a climate data server (CDS) 101 that performs the data and metadata storage and management functions of the service, a compute-storage platform 102 that provides the resources needed to run the climate data server, virtualization and provisioning software 103 that allows multiple climate data server instances to be built as virtual machine images, and service interface 104 whereby the capabilities of the persistence are made available to client devices.

Figure 2:
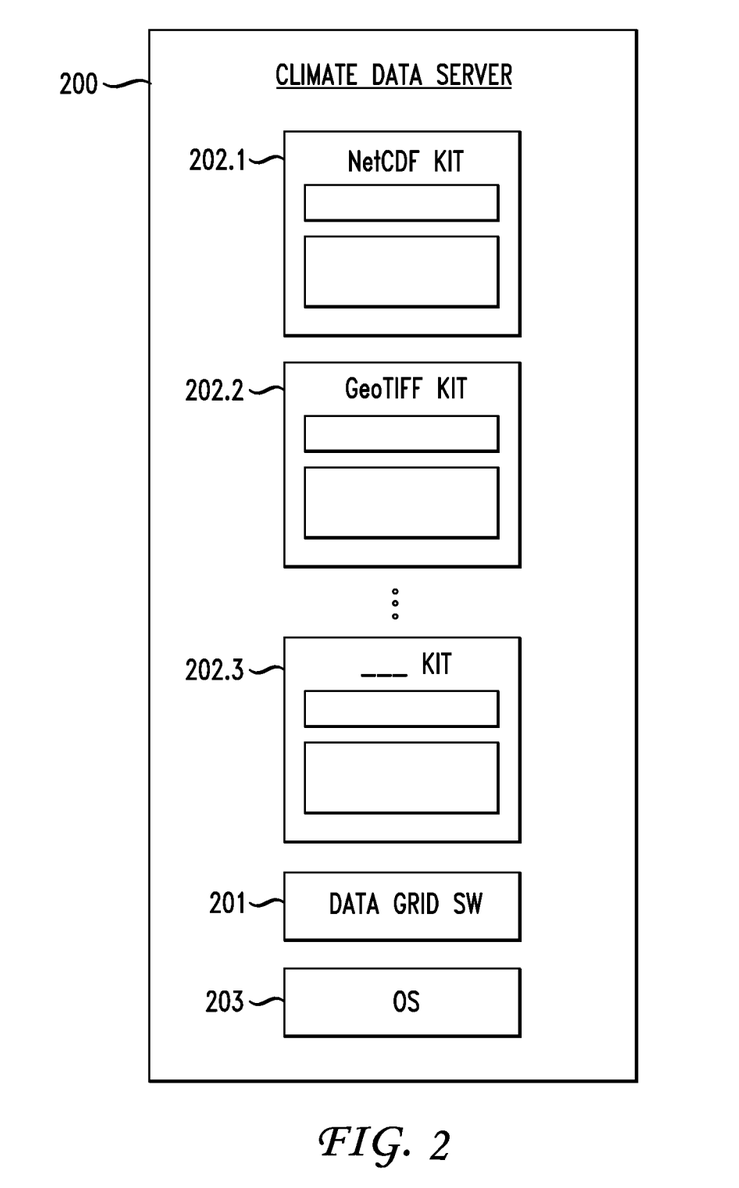
FIG. 2 illustrates an example climate data server.

FIG. 2 is a diagram showing an example climate data server (CDS) 200. CDS can implement the core functionality of the persistence service. The CDS can be a data server software appliance specialized to the needs of a managed collection of climate-related scientific data. CDS is designed to take advantage of the flexible resource allocation capabilities afforded by cloud computing. As described in greater detail below, to allow for ease of collections integration and support the full information lifecycle requirements of a scientific archive, CDS should be built around using scalable data grid technology.

The climate data server 200 used by the example persistence service includes the Integrated Rule-Oriented Data System (iRODS) data grid software 201 running in a SLES 11 SP3 operating system environment 203. Provisioning software 103 can encapsulate the operating system and iRODS in a virtual machine image. Various application-specific kits 202 are then used to specialize the CDS's functionality for particular uses. The example CDS has a Network Common Data Format (NetCDF) kit 202.1, a GeoTIFF data management kit 202.2, and can include other kits 202.3 with different formats and capabilities. In this way, the system can provide a virtual climate data server configured with application-specific kits.

Figure 3:
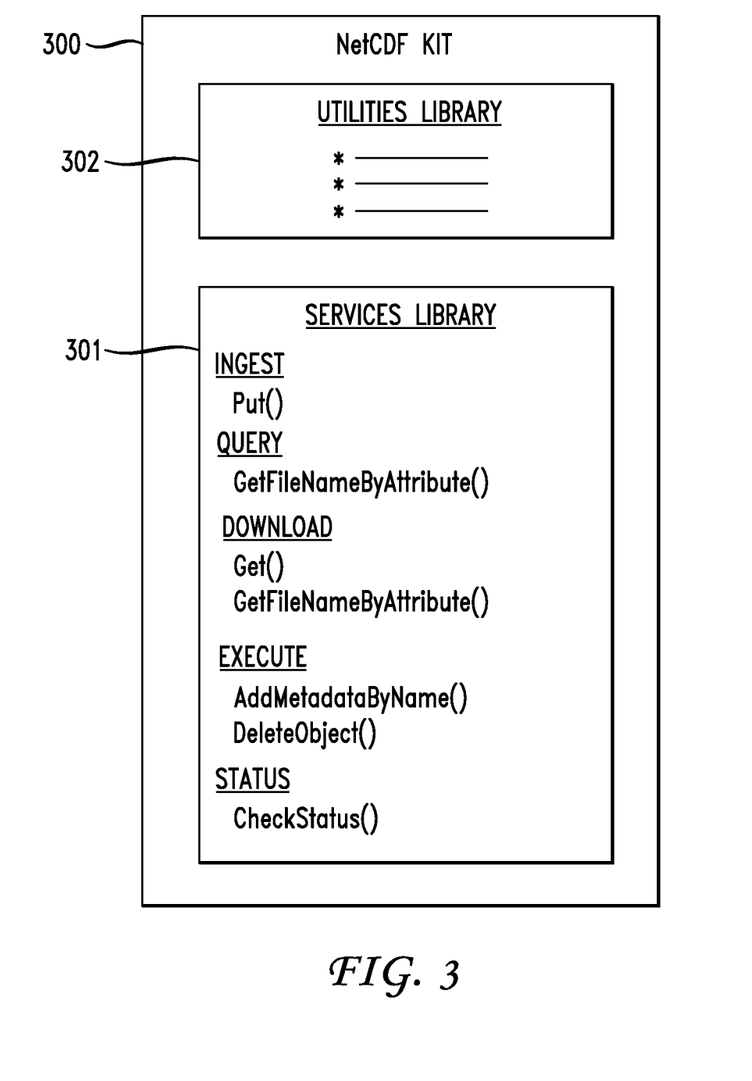
FIG. 3 illustrates an example NetCDF kit.

FIG. 3 illustrates an example NetCDF kit 300 that might be used in an embodiment of the climate data server. The NetCDF kit includes a services library 301 that contains the methods that implement the core functionality of the service and a utilities library 302 that provides ancillary methods that support the service functions. The system can organize the NetCDF kit's methods to contribute to the integrated analytics-archive management perspective of climate data analytics as a service. The functional capabilities of the service can correspond to the Open Archival Information System (OAIS) Reference Model data flow categories of an operational archive.

An OAIS is an archive associated with an organization of people and systems that have accepted the responsibility to preserve information and make that information available for a designated community. The term OAIS also refers to the International Standards Organization (ISO) OAIS Reference Model for an OAIS. While the OAIS model typically refers to space agencies, the OAIS model can be useful in a wide variety of other organizations and institutions with digital archiving needs. OAIS provides a framework for the understanding and increased awareness of archival concepts needed for long-term digital information preservation and access and provides the concepts needed by non-archival organizations to be effective participants in the preservation process.

The OAIS-based capability categories used to organize a persistence service's methods are ingest, query, order, download, execute, and status. "Ingest" methods input objects into the system, "query" methods retrieve metadata relating to data objects in the service, "order" methods dynamically create data objects, and "download" methods retrieve objects from the service. The execute and status categories have been added to the OAIS functional model to accommodate the dynamic nature of a climate data analytics as a service-type archive. "Execute" methods initiate service-definable operations that can extend the functionality of a service, and "status" methods check on the progress of running operations.

In one example embodiment, the NetCDF kit's services library contains five OAIS categories of capability: ingest, query, download, execute, and status, which collectively implement the classic "CRUD" operations of an archive: create, read, update, and delete data objects and metadata associated with the data objects. In further compliance with the OAIS Reference Model, the data objects managed by the NetCDF kit represent OAIS's Submission Information Package, Archive Information Package, and Dissemination Information Package abstractions. The NetCDF kit can treat the persistence service's data objects as OAIS packages.

In one example embodiment, the persistence service includes or invokes a Put order method that stores a user-specified payload and returns to the calling application a session identifier, a one word status update, and a detailed description of the session. A GetFileNameByAttribute query method can perform a metadata search operation on the data objects stored in the service according to user-specified parameters. The service can include two download capabilities: a Get method to download a previously ingested data object according to user-specified parameters, and a GetFileNameByAttribute method to query for a data object name according to user-specified parameters. In both cases, the user-specified parameters include a file name for a data object to be operated upon, a target destination path for an output data object, and an optional overwrite specification that stipulates whether the downloaded object destructively writes over a previously downloaded version of the object.

An AddMetaDataByName execute method can add metadata to a stored data object according to user-specified parameters including a file name for the target data object, a name specification for the metadata key to be associated with the target data object, a corresponding value for the key, and an optional unit specification. Outputs from the operation can include a unique session ID, a one word status message, and a detailed description of the session. A second execute capability, a DeleteObject method, can remove a stored data object for the service and returns a status message. Finally, a CheckStatus status method can check on the progress of service request based on an input session ID and return a status update message. User-specified parameters of the DeleteObject method can include a file name for the target data object and output can be a status update.

In one example embodiment, the NetCDF kit's utilities library contains methods that enable the persistence service to manage metadata in accordance with the OAIS Reference Model's metadata taxonomy, which recognizes four categories of metadata: Representation Information, Preservation Description Information, Policy Information, and Discovered Metadata. Specifically, the NetCDF kit's utilities library can contain a method that extracts the Representational Information and Preservation Description Information embedded in the self-describing NetCDF files and stores that information as a set of internal iRODS database tables managed by method libraries. This externalized metadata can facilitate discovery, and enable clients to perform searches over the NetCDF data objects stored in the persistence service without opening files to access embedded metadata. The utilities library can also contain a method that logs object-level actions, thereby enabling low-level system performance monitoring and optimization.

Figure 4:
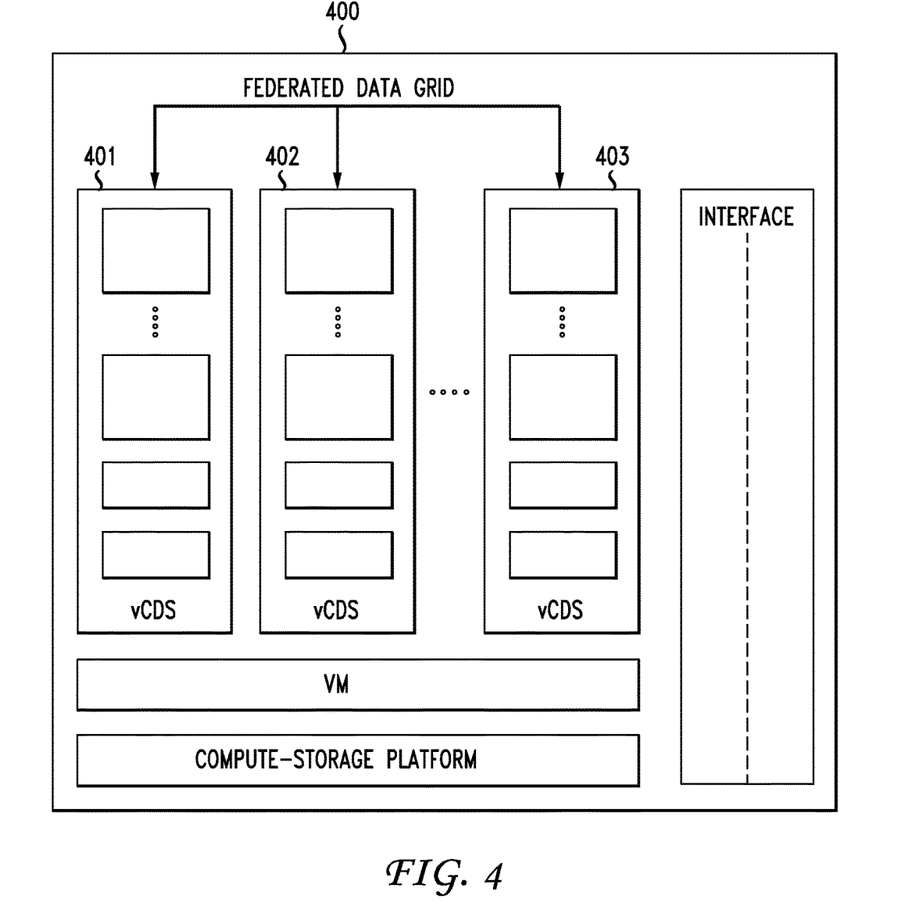
FIG. 4 illustrates an example data grid including a collection of federated virtual climate data servers.

FIG. 4 illustrates an example federated data grid 400 including a collection of federated virtual climate data servers (vCDS) 401, 402, 403. In this example, the persistence service includes an RPM Package Manager script for automatically building and installing instances of the climate data server software stack in various cloud computing environments. vCDSs provisioned in the cloud in this way can enable data access as Software-as-a-Service (SaaS). Further, because of iRODS's data grid capabilities, multiple vCDS instances can be federated to create cooperating assemblages of collections tailored to a specific need or task. In this way, the example federated data grid enables rapid and agile deployment of persistence service capabilities, and can be an important component of climate analytics as a service, because analytic services dynamically create new data objects and new, highly specialized collections.

Finally, the persistence service has a service interface 104 that exposes the capabilities of the service to external users and applications. The interface 104 has two components: an adapter module 104.1 that maps an incoming service request to the appropriate method and invokes the method and a representational state transfer (REST) module 104.2 that implements a RESTful web server that external applications can access over a network. In one example embodiment, the RESTful interface 104.2 is implemented as a PHP program. The communications protocol implemented by the RESTful service can also be based on the OAIS Reference Model's data flow categories.

Figure 5:
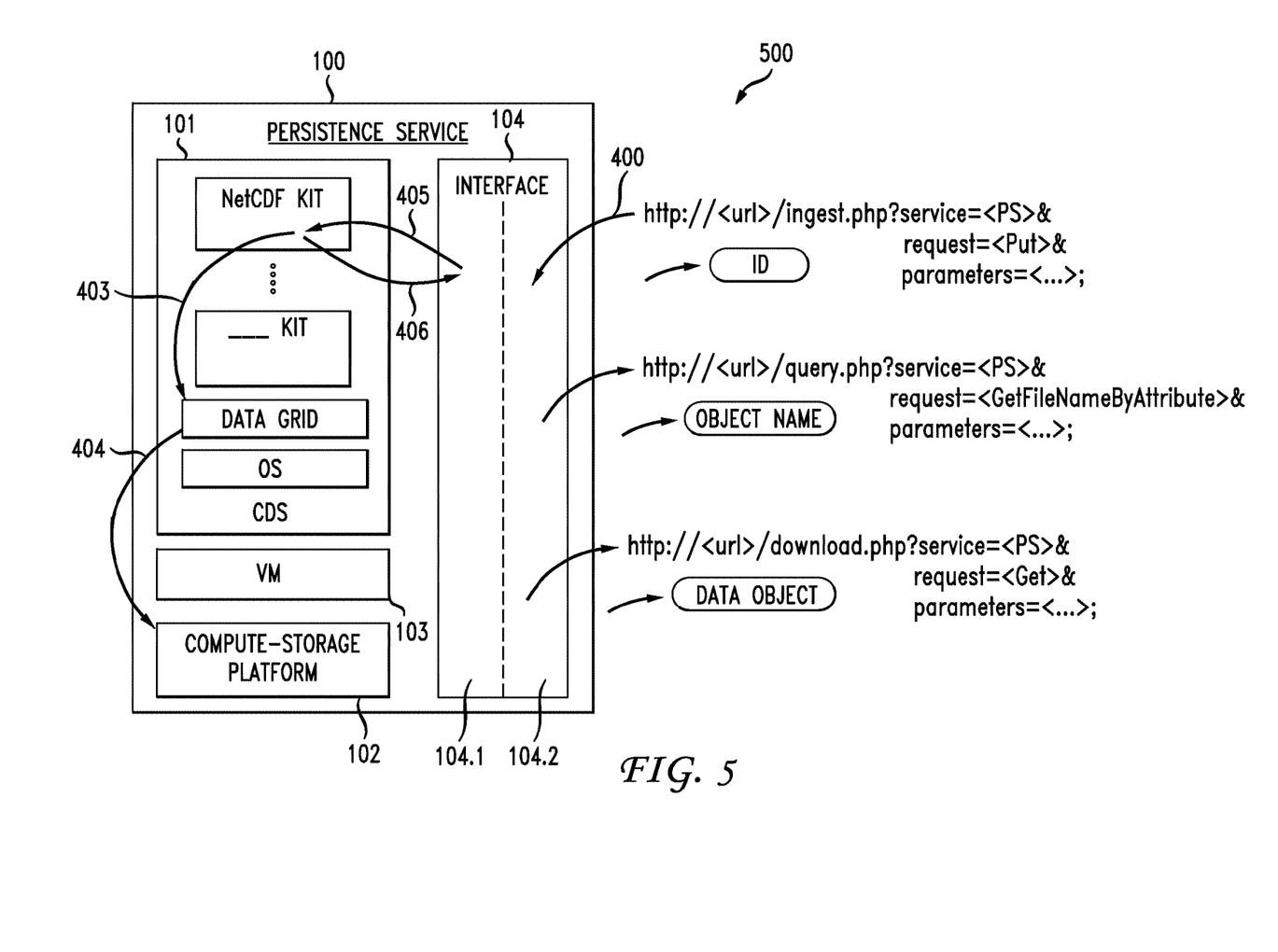
FIG. 5 illustrates an exemplary use of a persistence service.

FIG. 5 illustrates the basic patterns of interaction 500 among the components of the persistence service. In an example storage request, a user or application would submit a RESTful ingest service request 400 along with a pointer to the data object to be stored. The service interface 104 maps the incoming service request to the appropriate method 405, in this case the NetCDF kit's Put method 301, which would store the object in iRODS's storage system 403, 404 and return a session identifier 406 through the interface to the calling application. Subsequent query, execute, and download service requests would operate similarly.

Figure 6:
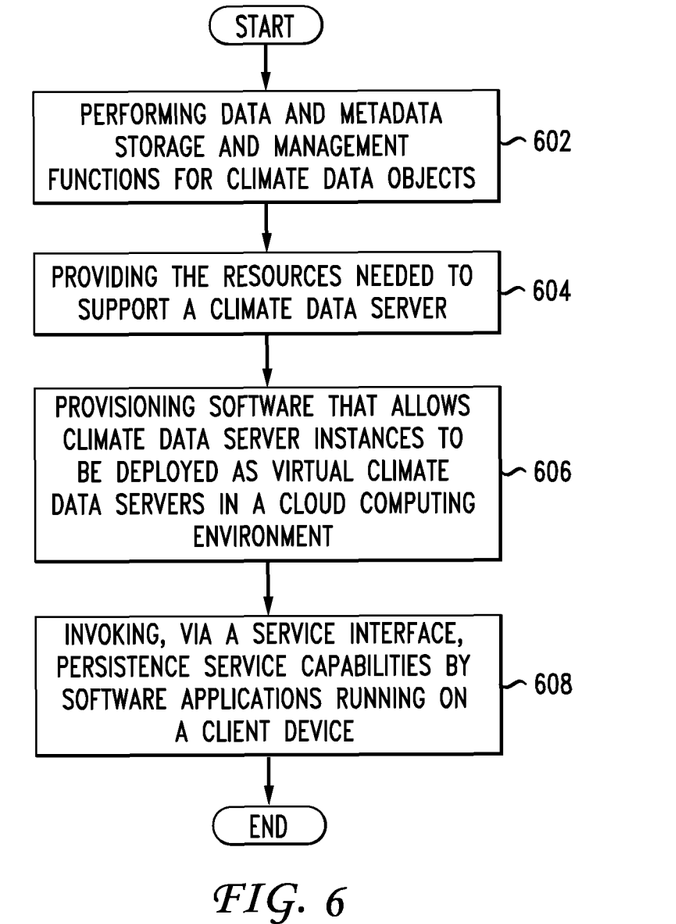
FIG. 6 illustrates an example method embodiment.

Having disclosed some basic system components and concepts, the disclosure now turns to the exemplary method embodiment shown in FIG. 6. For the sake of clarity, the method is described in terms of an exemplary system 500 as shown in FIG. 5 configured to practice the method. The steps outlined herein are exemplary and can be implemented in any combination thereof, including combinations that exclude, add, or modify certain steps.

A system 100 configured according to this disclosure can provide a climate data persistence service. The data persistence service can include a climate data server that performs data and metadata storage and management functions for climate data objects (602). The climate data objects can be International Organization for Standards (ISO) Open Archival Information System (OAIS) Reference Model Submission Information Packages, Archive Information Packages, and Dissemination Information Packages.

The data persistence service can include a compute-storage platform that provides the resources needed to support a climate data server (604). The data persistence service can further include provisioning software that allows climate data server instances to be deployed as virtual climate data servers in a cloud computing environment (606). The data persistence service can include a service interface, wherein persistence service capabilities are invoked by software applications running on a client device (608).

The data persistence service can further include data grid software that enables scalable, federated storage, management, discovery, and access, one or more application-specific kits that tailor the climate data server to particular uses and to particular file formats, and an operating system, such as SUSE Linux Enterprise Server, that enables the climate data server to run on the compute-storage platform. The data grid software can be an open source enterprise-ready distribution of the Integrated Rule-Oriented Data System Version 4.0 data management system. An application-specific kit can be a Network Common Data Format kit. The Network Common Data Format kit can include a services library, wherein a set of software applications implements the capabilities of the service, and a utilities library. The set of software applications can implement the support functions of the service. The services and utilities libraries can be, for example, Python classes.

The utilities library described above can include a function that extracts the embedded metadata in Network Common Data Format files and stores and manages the metadata separate from the stored data objects, a function that builds, populates, and manages the internal database tables of the data grid software according to International Organization for Standard Open Archival Information System Reference Model metadata categories of Representation Information, Preservation Description Information, Policy Information, and Discovered Metadata, and a function that logs object-level actions within the data grid software. In the services library, the functions that implement the capabilities of the service can correspond to International Organization for Standards Open Archival information System Reference Model data flow categories of an operational archive including various capabilities. The capabilities can include ingest capabilities that input data objects to the service, query capabilities that retrieve metadata relating to data objects in the service, order capabilities that dynamically creates data objects in the service, download capabilities that retrieve data objects from a service, execute capabilities that initiate service-definable operations, and status capabilities that check the progress of an order operation.

The ingest capability can include a Put method that stores a user-specified input payload in the persistence service. Output of the Put method can include a unique session identifier for the ingest session, a one word status update, and a detailed description of the session. The query capability can include or invoke a GetFileNameByAttribute method that performs a metadata search operation on the data objects stored in the persistence service according to user-specified selection parameters. Output of the GetFileNameByAttribute method can include data object names that have metadata attributes that match user-specified selection parameters.

The download capability can include a Get method that downloads a previously ingested data object according to user-specified parameters, and a GetFileNameByAttribute method that queries for a data object name according to user-specified parameters. The user-specified parameters can include a file name for a data object to be operated upon, a target destination path for an output data object, and an optional overwrite specification. The output of the Get and GetFileNameByAttribute methods can include the selected data object. The execute capability can include an AddMetaDataByName method that adds metadata to a data object stored in the persistence service according to user-specified parameters, and a DeleteObject method that removes a data object from the persistence service according to user-specified parameters. The user-specified parameters of AddMetaDataByName can include a file name for the target data object, a name specification for the metadata key to be associated with the target data object, a value to be associated with the specified key, and an optional unit specification. Outputs of the AddMetaDataByName method can include a unique session identifier for the execute session, a one word status update, and a detailed description of the session. The user-specified parameters of the DeleteObject method can include a file name for the target data object and output includes of status update.

The status capability can include a CheckStatus method that checks on the progress of a service request according to user-specified input parameters of a unique session identifier for the target service request. The output of the CheckStatus method can include a unique session identifier for the status session, a one word status update of the session identified by the input session identifier, and a detailed description of the target session. The various capabilities can collectively implement the classic create, read, update, and delete operations of an operational archive. The provisioning software can be RPM Package Manager scripts that build instances of the climate data server software stack in a cloud computing environment.

The services interface can include an adapter module that maps service requests from external client software applications to specific capabilities of the persistence service, and a representational state transfer server module that communicatively links the persistence service to external client software applications. The adapter module can include a service request-capability mapping based on the International Organization for Standards Archival Information System Reference Model data flow categories. In the representational state transfer module, the persistence service communicates to external client software applications through International Organization for Standards Open Archival Information System Reference Model-based uniform resource locators including an ingest endpoint of the general form http://<base URL>/ingest.php?service=<service_name>&request=<operation>&parameters=<parameters>, a query endpoint of the general form http://<base URL>/query.php?service=<service_name>&request=<operation>&parameters=<parameters>, an order endpoint of the general form http://<base URL>/order.php?service=<service_name>&request=<operation>&parameters=<parameters>, a download endpoint of the general form http://<base URL>/download.php?service=<service_name>&request=<operation>&parameters=<parameters>, an execute endpoint of the general form http://<base URL>/execute.php?service=<service_name>&request=<operation>&parameters=<parameters>, and a status endpoint of the general form http://<base URL>/status.php?service=<service_name>&request=<operation>&parameters=<parameters>. The services interface can be implemented as a PHP program.

Various embodiments of the disclosure are described in detail below. While specific implementations are described, it should be understood that this is done for illustration purposes only. Other components and configurations may be used without parting from the spirit and scope of the disclosure.

Figure 7:
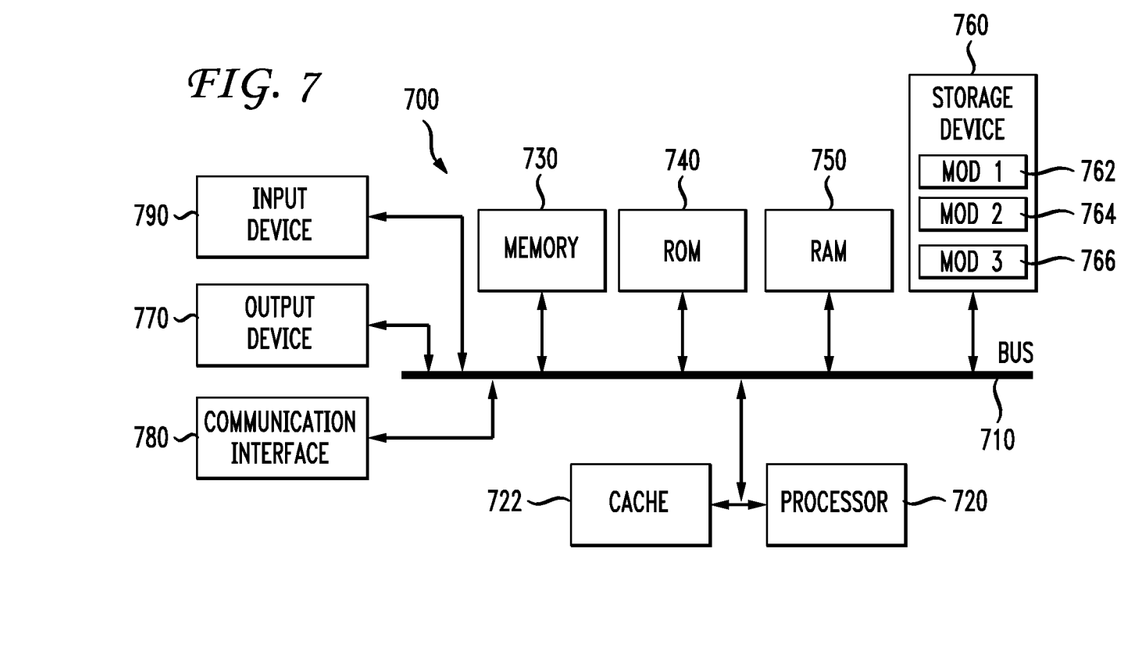
FIG. 7 illustrates an example system embodiment.

With reference to FIG. 7, an exemplary system and/or computing device 700 includes a processing unit (CPU or processor) 720 and a system bus 710 that couples various system components including the system memory 730 such as read only memory (ROM) 740 and random access memory (RAM) 750 to the processor 720. The system 700 can include a cache 722 of high-speed memory connected directly with, in close proximity to, or integrated as part of the processor 720. The system 700 copies data from the memory 730 and/or the storage device 760 to the cache 722 for quick access by the processor 720. In this way, the cache provides a performance boost that avoids processor 720 delays while waiting for data. These and other modules can control or be configured to control the processor 720 to perform various operations or actions. Other system memory 730 may be available for use as well. The memory 730 can include multiple different types of memory with different performance characteristics. It can be appreciated that the disclosure may operate on a computing device 700 with more than one processor 720 or on a group or cluster of computing devices networked together to provide greater processing capability. The processor 720 can include any general purpose processor and a hardware module or software module, such as module 1 762, module 2 764, and module 3 766 stored in storage device 760, configured to control the processor 720 as well as a special-purpose processor where software instructions are incorporated into the processor. The processor 720 may be a self-contained computing system, containing multiple cores or processors, a bus, memory controller, cache, etc. A multi-core processor may be symmetric or asymmetric. The processor 720 can include multiple processors, such as a system having multiple, physically separate processors in different sockets, or a system having multiple processor cores on a single physical chip. Similarly, the processor 720 can include multiple distributed processors located in multiple separate computing devices, but working together such as via a communications network. Multiple processors or processor cores can share resources such as memory 730 or the cache 722, or can operate using independent resources. The processor 720 can include one or more of a state machine, an application specific integrated circuit (ASIC), or a programmable gate array (PGA) including a field PGA.

The system bus 710 may be any of several types of bus structures including a memory bus or memory controller, a peripheral bus, and a local bus using any of a variety of bus architectures. A basic input/output (BIOS) stored in ROM 740 or the like, may provide the basic routine that helps to transfer information between elements within the computing device 700, such as during start-up. The computing device 700 further includes storage devices 760 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 760 can include software modules 762, 764, 766 for controlling the processor 720. The system 700 can include other hardware or software modules. The storage device 760 is connected to the system bus 710 by a drive interface. The drives and the associated computer-readable storage devices provide nonvolatile storage of computer-readable instructions, data structures, program modules and other data for the computing device 700. In one aspect, a hardware module that performs a particular function includes the software component stored in a tangible computer-readable storage device in connection with the necessary hardware components, such as the processor 720, bus 710, display 770, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 700 is a small, handheld computing device, a desktop computer, or a computer server. When the processor 720 executes instructions to perform "operations", the processor 720 can perform the operations directly and/or facilitate, direct, or cooperate with another device or component to perform the operations.

Although the exemplary embodiment(s) described herein employs the hard disk 760, other types of computer-readable storage devices which can store data that are accessible by a computer, such as magnetic cassettes, flash memory cards, digital versatile disks (DVDs), cartridges, random access memories (RAMs) 750, read only memory (ROM) 740, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 700, an input device 790 represents any number of input mechanisms, such as a microphone for speech, a touch-sensitive screen for gesture or graphical input, keyboard, mouse, motion input, speech and so forth. An output device 770 can also be one or more of a number of output mechanisms known to those of skill in the art. In some instances, multimodal systems enable a user to provide multiple types of input to communicate with the computing device 700. The communications interface 780 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 720. The functions these blocks represent may be provided through the use of either shared or dedicated hardware, including, but not limited to, hardware capable of executing software and hardware, such as a processor 720, that is purpose-built to operate as an equivalent to software executing on a general purpose processor. For example the functions of one or more processors presented in FIG. 7 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 740 for storing software performing the operations described below, and random access memory (RAM) 750 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 700 shown in FIG. 7 can practice all or part of the recited methods, can be a part of the recited systems, and/or can operate according to instructions in the recited tangible computer-readable storage devices. Such logical operations can be implemented as modules configured to control the processor 720 to perform particular functions according to the programming of the module. For example, FIG. 7 illustrates three modules Mod1 762, Mod2 764 and Mod3 766 which are modules configured to control the processor 720. These modules may be stored on the storage device 760 and loaded into RAM 750 or memory 730 at runtime or may be stored in other computer-readable memory locations.

One or more parts of the example computing device 700, up to and including the entire computing device 700, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations.

Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 720 can include all types of processors disclosed herein, including a virtual processor. However, when referring to a virtual processor, the processor 720 includes the software components associated with executing the virtual processor in a virtualization layer and underlying hardware necessary to execute the virtualization layer. The system 700 can include a physical or virtual processor 720 that receive instructions stored in a computer-readable storage device, which cause the processor 720 to perform certain operations. When referring to a virtual processor 720, the system also includes the underlying physical hardware executing the virtual processor 720.

Embodiments within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply generally to climate data, but can also apply to other non-climate data sets. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

We claim:

1. A system for providing a climate data persistence service,
    the system comprising:
    a climate data server that performs data and metadata storage and management functions for climate data objects;
    a compute-storage platform that provides a number of resources needed to support a climate data server;
    provisioning software that allows climate data server instances to be deployed as virtual climate data servers in a cloud computing environment; and
    a service interface, wherein persistence service capabilities are invoked by software applications running on a client device;
    wherein the climate data server further comprises:
    a computer-readable storage device having stored therein data grid software which, when executed by a processor, causes the processor to enable scalable, federated storage, management, discovery, and access;
    one or more application-specific kits that tailor the climate data server to particular uses and to particular file formats; wherein at least one of the one or more application-specific kits comprises a Network Common Data Format kit; wherein the Network Common Data Format kit comprises:
    a services library, wherein a plurality of software applications implement the capabilities of the service; and
    a utilities library, wherein a plurality of software applications implement the support functions of the service; wherein the utilities library further comprises:
    a first function that extracts the embedded metadata in Network Common Data Format files and stores and manages the metadata separate from the stored data objects;
    a second function that builds, populates, and manages the internal database tables of data grid software according to International Organization for Standards Open Archival Information System Reference Model metadata categories of Representation Information, Preservation Description Information, Policy Information, and Discovered Metadata; and
    a third function that logs object-level actions within the data grid software; and
    an operating system that enables the climate data server to run on the compute-storage platform.

2. The system of claim 1, wherein the climate data objects represent at least one of International Organization for Standards (ISO) Open Archival Information System (OAIS)

Reference Model Submission Information Packages, Archive Information Packages, and Dissemination Information Packages.

3. The system of claim 1, wherein the data grid software comprises an open source enterprise-ready distribution of the Integrated Rule-Oriented Data System Version 4.0 data management system.

4. The system of claim 1, wherein the operating system is SLES 11, SP 3.

5. The system of claim 1, wherein the services library and the utilities library comprise Python classes.

6. The system of claim 1, wherein the services library comprises methods that implement capabilities of the service that correspond to the International Organization for Standards Open Archival information System Reference Model data flow categories of an operational archive comprising:
   ingest capabilities that input data objects to the service;
   query capabilities that retrieve metadata relating to data objects in the service;
   order capabilities that dynamically create data objects in the service;
   download capabilities that retrieve data objects from a service;
   execute capabilities that initiate service-definable operations; and
   status capabilities that check on the progress of an order operation.

7. The system of claim 6, wherein the ingest capabilities further comprise a Put method that stores a user-specified input payload in the persistence service.

8. The system of claim 7, wherein outputs from the Put method comprise a unique session identifier for an ingest session, a one word status update, and a detailed description of the ingest session.

9. The system of claim 6, wherein the query capabilities further comprise a GetFileNameByAttribute method that performs a metadata search operation on the data objects stored in the persistence service according to user-specified selection parameters.

10. The system of claim 9, wherein output of the GetFileNameByAttribute method comprises data object names that have metadata attributes that match user-specified selection parameters.

11. The system of claim 6, wherein the download capabilities further comprise:
   a Get method that downloads a previously ingested data object according to user-specified parameters; and
   a GetFileNameByAttribute method that queries for a data object name according to user-specified parameters.

12. The system of claim 11, wherein the user-specified parameters comprise:
   a file name for a data object to be operated upon;
   a target destination path for an output data object; and
   an optional overwrite specification.

13. The system of claim 11, wherein output of the Get method and the GetFileNameByAttribute method comprises a selected data object.

14. The system of claim 6, wherein the execute capabilities further comprise:
   an AddMetaDataByName method that adds metadata to a data object stored in the persistence service according to user-specified parameters; and
   a DeleteObject method that removes a data object from the persistence service according to user-specified parameters.

15. The system of claim 14, wherein the user-specified parameters of the AddMetaDataByName method comprise:
   a file name for the target data object;
   a name specification for the metadata key to be associated with the target data object;
   a value to be associated with the specified key; and
   an optional unit specification.

16. The system of claim 14, wherein output of the AddMetaDataByName method comprises a unique session identifier for the execute session, a one word status update, and a detailed description of the session.

* * * * *